US012416202B2

(12) United States Patent
Lu

(10) Patent No.: US 12,416,202 B2
(45) Date of Patent: Sep. 16, 2025

(54) GRAVITY-FREE SPRING ROLLER BLIND CONTROLLER

(71) Applicant: Ningbo Jieshu Window Coverings Manufacturing Co. Ltd., Ningbo (CN)

(72) Inventor: Jiebing Lu, Ningbo (CN)

(73) Assignee: Ningbo Jieshu Window Coverings Manufacturing Co. Ltd., Ningbo (CN)

( * ) Notice: Subject to any disclaimer, the term of this patent is extended or adjusted under 35 U.S.C. 154(b) by 140 days.

(21) Appl. No.: 18/462,828

(22) Filed: Sep. 7, 2023

(65) Prior Publication Data

US 2024/0401406 A1 Dec. 5, 2024

(30) Foreign Application Priority Data

May 30, 2023 (CN) ........................ 202310625142.6

(51) Int. Cl.
*E06B 9/60* (2006.01)
*E06B 9/44* (2006.01)

(52) U.S. Cl.
CPC . *E06B 9/60* (2013.01); *E06B 9/44* (2013.01)

(58) Field of Classification Search
CPC ................. E06B 9/44; E06B 9/60; E06B 9/62
See application file for complete search history.

(56) References Cited

U.S. PATENT DOCUMENTS

| | | | | | |
|---|---|---|---|---|---|
| 5,167,269 | A * | 12/1992 | Abo | E06B 9/90 160/321 |
| 5,542,464 | A * | 8/1996 | Shiina | E06B 9/56 160/321 |
| 5,964,426 | A * | 10/1999 | Tabellini | E06B 9/60 242/375 |
| 2024/0309700 | A1 * | 9/2024 | Chou | E06B 9/323 |
| 2024/0401406 | A1 * | 12/2024 | Lu | E06B 9/44 |

* cited by examiner

*Primary Examiner* — Johnnie A. Shablack
(74) *Attorney, Agent, or Firm* — FOLEY & LARDNER LLP

(57) ABSTRACT

Provided in the present invention is a gravity-free spring roller blind controller. The gravity-free spring roller blind controller comprises a torque adjustment assembly and a torsion spring connecting rod assembly. The torque adjustment assembly comprises a bracket, a torsion spring mounting seat, a guide sleeve, and a roller blind sleeve. A one-way torsion spring is sleeved on a mounting shaft of the torsion spring mounting seat, the guide sleeve is further rotatably sleeved with a torque adjustment knob, the guide sleeve is provided with a first flange, and a second flange is provided on the torque adjustment knob. The first flange reversely pushes the one-way torsion spring so that the one-way torsion spring is locked tightly onto the mounting shaft. According to the present invention, the torque of the torsion spring on the torsion spring connecting rod assembly is increased or decreased by forwardly or reversely rotating the second flange.

10 Claims, 15 Drawing Sheets

GRAVITY-FREE SPRING ROLLER BLIND CONTROLLER

CROSS-REFERENCE TO RELATED PATENT APPLICATIONS

The present application claims priority to and the benefit of Chinese Patent Application No. 202310625142.6, filed May 30, 2023, the entire disclosure of which is incorporated herein by reference.

TECHNICAL FIELD

The present invention relates to the technical field of roller blinds, and particularly relates to a gravity-free spring roller blind controller.

BACKGROUND

Roller blinds are one kind of window decoration products, in which the curtain cloth is rolled into a roller. For most of roller blinds, pull ropes or chains are used for rising and falling.

Spring roller blinds are a kind of roller blinds, and the elastic force thereof can adjust the curtain cloth to rise and fall within a certain range, and can stop the curtain cloth at any position, which is mainly realized by an internal torsion spring to offset the torque. At present, some existing spring roller blinds generally cannot adjust the magnitude of the torsion spring torque after an initial torque is adjusted in place during installation. For example, after a spring roller blind is used for a long time, the torsion spring torque inside the spring roller blind will change, resulting in the inability to realize the function of stopping the curtain cloth at any position, that is, the spring roller blind will fail. In most cases, the spring roller blind needs to be disassembled to replace the torsion spring or to adjust the torque of the torsion spring thereof, so it is subjected to limitations in use and function to a certain extent.

SUMMARY

According to an exemplary embodiment, a gravity-free spring roller blind controller is configured to be mounted on a shaft end of a hollow roller blind shaft, and the roller blind shaft is wound with a roller blind. The controller comprises a torque adjustment assembly and a torsion spring connecting rod assembly connected to each other. The torque adjustment assembly comprises a bracket, a torsion spring mounting seat fixed on the bracket, a guide sleeve rotatably sleeved on the torsion spring mounting seat, and a roller blind sleeve rotatably sleeved on the guide sleeve. The torsion spring connecting rod assembly comprises a connecting rod group coaxially fixedly connected to the guide sleeve, a torsion spring and an inner sleeve connected to one end of the torsion spring are mounted on the connecting rod group, the inner sleeve is fixedly connected to the roller blind shaft, and the roller blind shaft drives the torsion spring to rotate through the inner sleeve. A one-way torsion spring is sleeved on a mounting shaft of the torsion spring mounting seat, the guide sleeve is further rotatably sleeved with a torque adjustment knob, a first flange is provided within an inner cavity of the guide sleeve, and a second flange falling within the inner cavity is provided on the torque adjustment knob. When in a normal state, the first flange reversely pushes the one-way torsion spring so that the one-way torsion spring is locked tightly onto the mounting shaft. When torque adjustment is performed, the torque adjustment knob is forwardly or reversely rotated, and the second flange forwardly or reversely drives the guide sleeve and the connecting rod group to rotate through a torsion arm of the one-way torsion spring, so that the torque of the torsion spring is increased or decreased.

Figure 1:
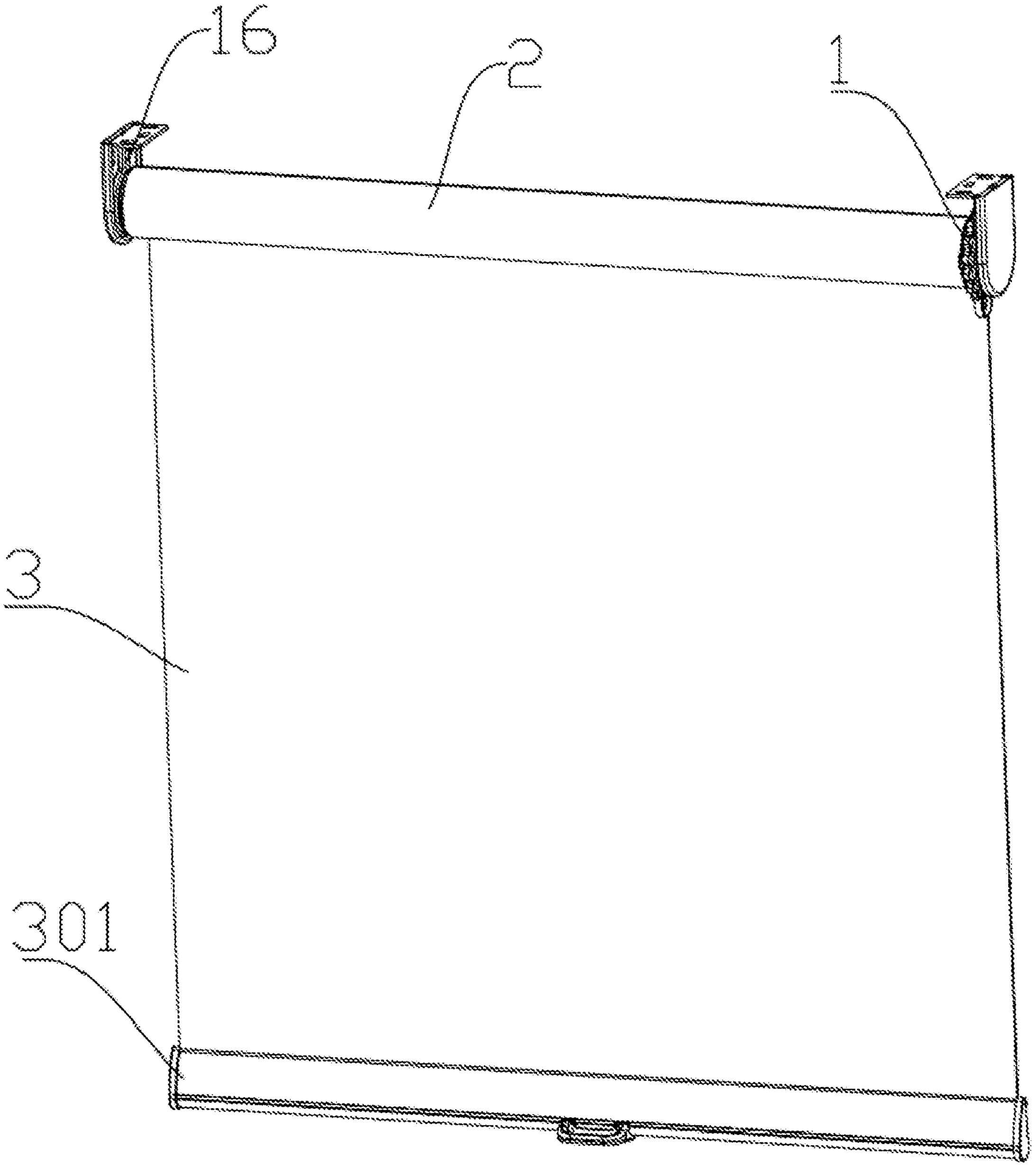
FIG. 1 is a perspective view of the present invention being mounted on a roller blind shaft.
Figure 2:
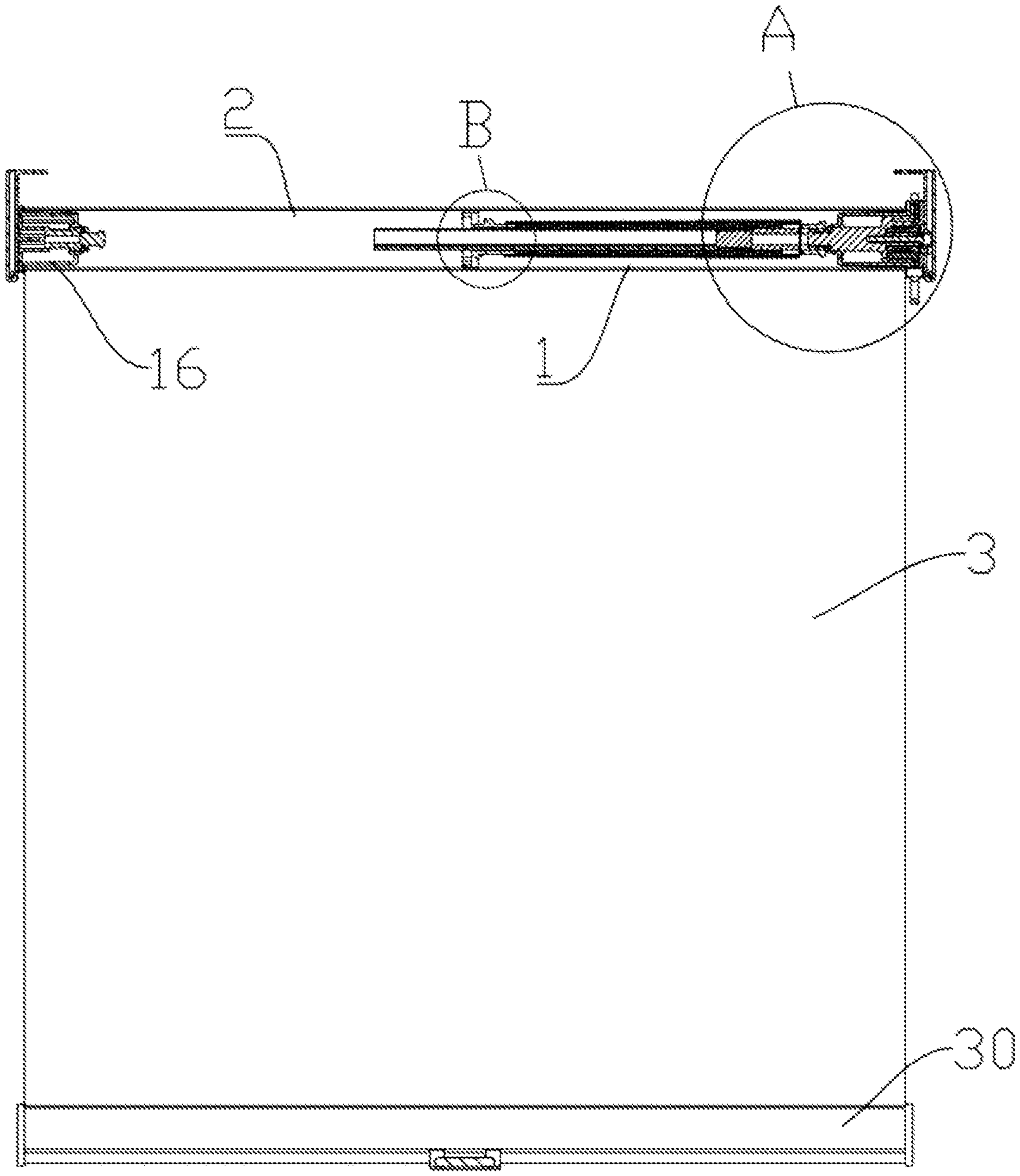
FIG. 2 is a structural schematic view of the present invention being mounted on the roller blind shaft.

The names of the components corresponding to reference signs in the figures are as follows: 1. controller; 2. roller blind shaft; 3. roller blind; 4. bracket; 5. torsion spring mounting seat; 6. guide sleeve; 7. roller blind sleeve; 8. torsion spring; 9. inner sleeve; 10. one-way torsion spring; 11. torque adjustment knob; 12. torsion spring mounting rod; 13. connecting rod; 14. positioning shaft sleeve; 15. positioning engagement cavity; 16. rotation stop block; 17. bolt; 301. lower beam; 501. mounting shaft; 502. guide hole; 503. hook; 504. fourth rotation stop hole; 601. first flange; 602. snap-fit protrusion; 603. first guide shaft; 604. second guide shaft; 605. third guide shaft; 606. inner cavity; 607. second rotation stop hole; 701. first rotation stop hole; 801. first connecting arm; 802. second connecting arm; 901. connecting hook recess; 1001. first torsion arm; 1002. second torsion arm; 1101. second flange; 1102. third rotation stop hole; 1201. guide flange; 1301. first through cavity; 1302. snap-fit recess; 1303. guide block; 1304. guide engagement recess; 1305. rib; 1401, second through cavity; and 1402. guide recess.

DETAILED DESCRIPTION (I) Technical problem to be solved

The problem to be solved by the present invention is how to provide a gravity-free spring roller blind controller, which can adjust the torque of an internal torsion spring in real time through a torque adjustment knob, and has the function of adjusting the torque without disassembly.

(II) Technical solution

In order to solve the technical problem, the present invention provides a gravity-free spring roller blind controller, the controller being configured to be mounted on a shaft end of a hollow roller blind shaft, and the roller blind shaft being wound with a roller blind, wherein the controller comprises a torque adjustment assembly and a torsion spring connecting rod assembly connected to each other, and the torque adjustment assembly comprises a bracket, a torsion spring mounting seat fixed on the bracket, a guide sleeve rotatably sleeved on the torsion spring mounting seat, and a roller blind sleeve rotatably sleeved on the guide sleeve; the torsion spring connecting rod assembly comprises a connecting rod group coaxially fixedly connected to the guide sleeve, a torsion spring and an inner sleeve connected to the torsion spring are mounted on the connecting rod group, the inner sleeve is inserted within the roller blind shaft and fixedly connected thereto by interference, and the roller blind shaft drives the torsion spring to rotate through the inner sleeve; a one-way torsion spring is sleeved on a mounting shaft of the torsion spring mounting seat, the guide sleeve is further rotatably sleeved with a torque adjustment knob, a first flange is provided within an inner cavity of the guide sleeve, and a second flange falling within the inner cavity is provided on the torque adjustment knob; when in a normal state, the first flange reversely pushes the one-way torsion spring so that the one-way torsion spring is locked tightly onto the mounting shaft, that is, the first flange cannot push the one-way torsion spring to rotate; and when torque adjustment is performed, the torque adjustment knob is forwardly or reversely rotated, and the second flange forwardly or reversely drives the guide sleeve and the connecting rod group to rotate through a torsion arm of the one-way torsion spring, so that the torque of the torsion spring is increased or decreased.

According to the present invention, the one-way torsion spring can only be driven to rotate through the forward or reverse rotation of the torque adjustment knob, so as to drive the guide sleeve and the connecting rod group to rotate. Therefore, the magnitude of the torque of the torsion spring can only be adjusted by rotating the torque adjustment knob.

As an improvement of the present invention, the one-way torsion spring comprises a first torsion arm and a second torsion arm, and the first flange is arranged between the first torsion arm and the second torsion arm; and when in the normal state, the first flange abuts against the first torsion arm so that the one-way torsion spring is locked tightly onto the mounting shaft. The normal state described in the present invention refers to that the controller has been mounted into the roller blind shaft, and the torsion spring thereof has the torque required to balance the roller blind. Therefore, in the normal state, the torsion spring makes the first flange of the guide sleeve be in contact with the first torsion arm of the one-way torsion spring, so that the one-way torsion spring is mounted tightly onto the mounting shaft.

As an improvement of the present invention, the connecting rod group comprises a torsion spring mounting rod and a connecting rod fixedly connected to each other, and the connecting rod is coaxially fixedly connected to the guide sleeve; and a first connecting arm of the torsion spring is mounted on the connecting rod.

As an improvement of the present invention, a positioning shaft sleeve is sleeved on the connecting rod, and the connecting rod and the positioning shaft sleeve are combined to form a positioning engagement cavity for positioning the first connecting arm; and the inner sleeve is rotatably mounted on the torsion spring mounting rod, and a connecting hook recess for positioning and connecting a second connecting arm of the torsion spring is provided on the inner sleeve.

As an improvement of the present invention, a first through cavity for placing the first connecting arm is provided on the connecting rod to run therethrough, the positioning shaft sleeve is correspondingly provided with a second through cavity, and the first through cavity and the second through cavity are enclosed to form the positioning engagement cavity; a snap-fit recess is provided within a square hole at an end of the connecting rod, and a snap-fit protrusion is correspondingly formed on a square shaft at an end of the guide sleeve; and the square hole of the connecting rod is in fit with a square shaft at an end of the guide sleeve, and the snap-fit recess is engaged with the snap-fit protrusion.

As an improvement of the present invention, at least one guide recess is provided on an outer peripheral surface of the positioning shaft sleeve, a guide block fitting the guide recess is correspondingly provided on an outer peripheral surface of the connecting rod, and a shaft shoulder at one end of the guide sleeve limits the position of a side end surface of the positioning shaft sleeve and abuts the same.

As an improvement of the present invention, a guide flange is provided in an inner hole of the torsion spring mounting rod, one end of the connecting rod is provided with a guide engagement recess corresponding to the guide flange, and the one end of the connecting rod is further provided with a plurality of ribs in interference fit with the inner hole of the torsion spring mounting rod.

As an improvement of the present invention, a first guide shaft and a second guide shaft configured to rotatably engage with the roller blind sleeve are formed on an outer peripheral surface of the guide sleeve, a engagement ring is further mounted on the guide sleeve, and the axial displacement of the roller blind sleeve on the guide sleeve is limited by means of the engagement ring; a protruding third guide shaft is provided within the inner cavity of the guide sleeve, the mounting shaft is coaxially provided with a guide hole, and the third guide shaft is rotatably engaged with the guide hole; and a side end of the torsion spring mounting seat is provided with a hook configured to be hooked and mounted on the bracket, and the bracket is fixedly mounted on an external wall.

As an improvement of the present invention, a detachable rotation stop block is further mounted on the torque adjustment assembly, a first rotation stop hole is correspondingly provided on an outer peripheral surface of the roller blind sleeve, a second rotation stop hole is correspondingly provided on an outer peripheral surface of the guide sleeve, a third rotation stop hole is correspondingly provided on an outer peripheral surface of the torque adjustment knob, and a fourth rotation stop hole is correspondingly provided on an outer peripheral surface of the torsion spring mounting seat. The rotation stop holes are correspondingly engaged with the rotation stop blocks to limit the rotation of the roller blind sleeve, the guide sleeve, the torque adjustment knob, and the torsion spring mounting seat. The rotation stop blocks may be disassembled during installation and use.

As an improvement of the present invention, the roller blind sleeve is connected to the roller blind shaft, the lower end of the roller blind comprises a lower beam, and a supporting sleeve is mounted at the other end of the roller blind shaft, wherein the supporting sleeve has the same function as that of the roller blind sleeve, and is used to support the roller blind shaft; and the first flange and the second flange each are fan-shaped.

(III) Beneficial effects

The gravity-free spring roller blind controller provided in the present invention has the following advantages compared with the prior art:

1) The adjustment of the magnitude of the torsion force of the torsion spring is realized by rotating the torque adjustment knob, so that the roller blind has the function of stopping at any height position. The structure design of the entire controller is logical. After the torsion spring is used for a long time and thus the torsion force changes, the torque adjustment knob can be manually rotated to adjust the magnitude of the torsion force, which is convenient to adjust and has the function of adjusting the torque without disassembly.
2) The one-way torsion spring is provided to prevent the torsion force of the torsion spring on the torsion spring connecting rod assembly from being transmitted to the one-way torsion spring and the torque adjustment knob. The guide sleeve can only make the one-way torsion spring be locked tightly onto the mounting shaft of the torsion spring mounting seat, and the one-way torsion spring can only be driven to rotate by rotating the torque adjustment knob counterclockwise or clockwise, thereby driving the rotation of the guide sleeve, the torsion spring mounting rod and the connecting rod, and further adjusting the magnitude of the torsion force of the torsion spring.
3) The torque adjustment assembly where the torque adjustment knob is located, and the torsion spring connecting rod assembly where the torsion spring is located, can be assembled and disassembled separately. The torque adjustment assembly and the torsion spring connecting rod assembly are coaxially connected through insertion connection between a square hole and a square shaft, and are fixedly connected through fitting of the snap-fit protrusion with the snap-fit recess.
4) The torsion spring mounting seat, the guide sleeve, the roller blind sleeve, and the torque adjustment knob are arranged coaxially. Through fitting of the guide hole and the third guide shaft, the torsion spring mounting seat makes the guide seat be rotatably mounted on the torsion spring mounting seat. The guide seat is rotatably engaged with the roller blind sleeve through the first guide shaft and the second guide shaft, so that the roller blind sleeve can rotate relatively, enabling the roller blind shaft to be supported thereby.
5) The rotation stop blocks are provided, and can prevent the relative rotation of the roller blind sleeve, the guide sleeve, the torque adjustment knob, and the torsion spring mounting seat during product transportation, and can be pulled out during installation and use.

Specific implementations of the present invention will be further described in detail below with reference to the accompanying drawings and embodiments. The following embodiments are used to illustrate the present invention, but are not intended to limit the scope of the present invention.

Referring to FIGS. 1 to 22, the present invention provides a gravity-free spring roller blind controller. The controller 1 is configured to be mounted on a shaft end of a hollow roller blind shaft 2. A roller blind 3 is wound on the roller blind shaft 2. The lower end of the roller blind 3 includes a lower beam 301. The controller 1 includes a torque adjustment assembly and a torsion spring connecting rod assembly connected to each other. The torque adjustment assembly includes a bracket 4, a torsion spring mounting seat 5 fixed on the bracket 4, a guide sleeve 6 rotatably sleeved on the torsion spring mounting seat 5, and the roller blind sleeve 7 rotatably sleeved on the guide sleeve 6. The torsion spring mounting seat 5, the guide sleeve 6, the roller blind sleeve 7, and the torque adjustment knob 11 are coaxially arranged. The roller blind sleeve 7 is used to connect the roller blind shaft 2. A supporting sleeve 16 is mounted at the other end of the roller blind shaft 2. Referring to FIGS. 14 to 20, the torsion spring connecting rod assembly includes a connecting rod group coaxially fixedly connected to the guide sleeve 6, and a torsion spring 8 and an inner sleeve 9 connected to the torsion spring 8 are mounted on the connecting rod group. The inner sleeve 9 is connected to the roller blind shaft 2, and the roller blind shaft 2 drives the torsion spring 8 to rotate through the inner sleeve 9. A one-way torsion spring 10 is sleeved on a mounting shaft 501 of the torsion spring mounting seat 5. The guide sleeve 6 is further rotatably sleeved with a torque adjustment knob 11. A first flange 601 is provided within an inner cavity 606 of the guide sleeve 6, and a second flange 1101 falling within the inner cavity 606 is provided on the torque adjustment knob 11. When in a normal state, the first flange 601 reversely pushes the one-way torsion spring 10 so that it is locked tightly onto the mounting shaft 501. When torque adjustment is performed (that is, the torque of the torsion spring 8 is adjusted), the torque adjustment knob 11 is forwardly or reversely rotated. The second flange 1101 forwardly or reversely drives the first flange 601 of the guide sleeve 6 and the connecting rod group to rotate through a torsion arm of the one-way torsion spring 10, so that the torque of the torsion spring 8 is increased or decreased. The torsional force of the torsion spring 8 can be adjusted without disassembling the adjuster, which has the function of adjusting the torque without disassembly. The one-way torsion spring 10 is a clasping torsion spring. Pushing the one-way torsion spring 10 reversely can only make it mounted tightly onto the mounting shaft 501, and the one-way torsion spring 10 can only be driven by the torque adjustment knob 11.

Figure 4:
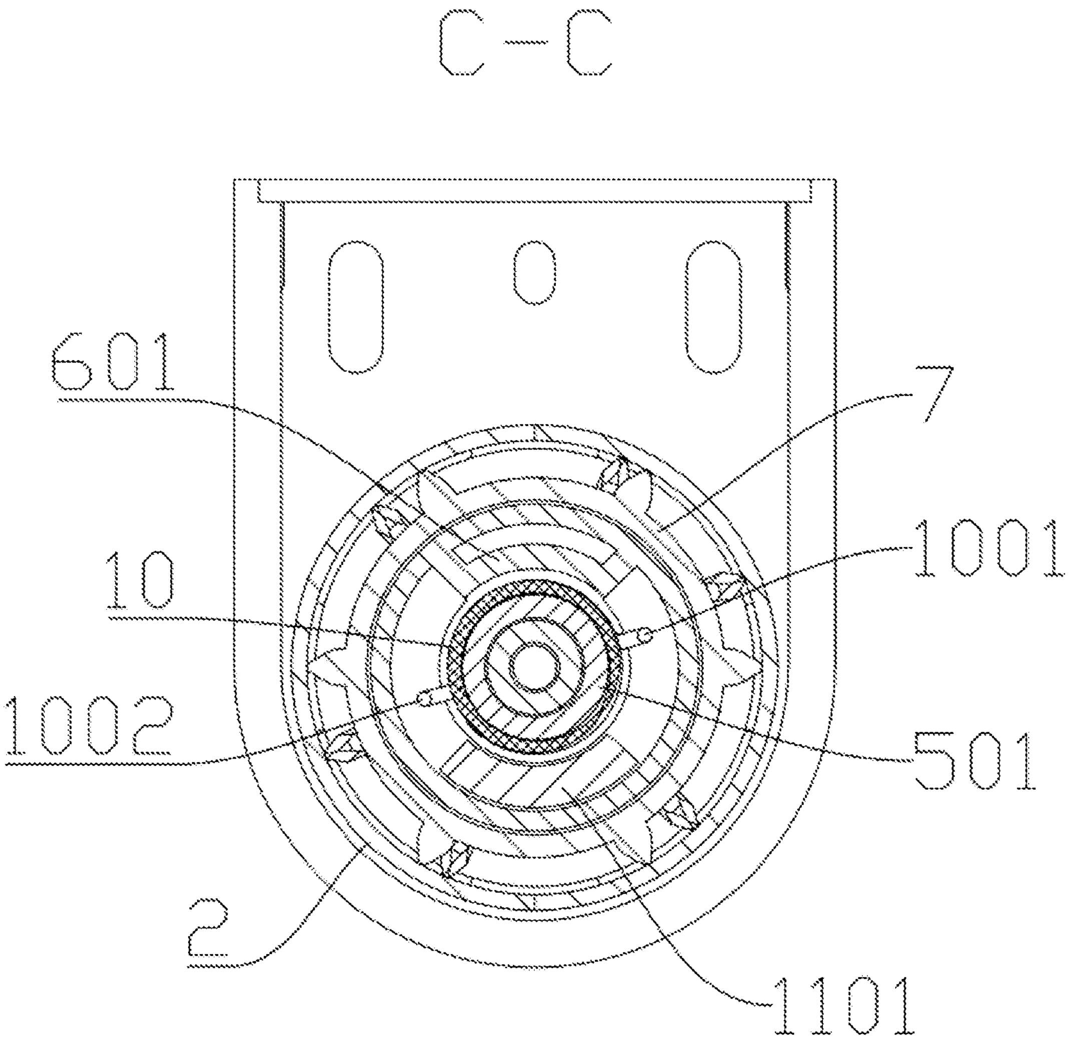
FIG. 4 is a cross-sectional view of C-C in FIG. 3 of the present invention.
Figure 5:
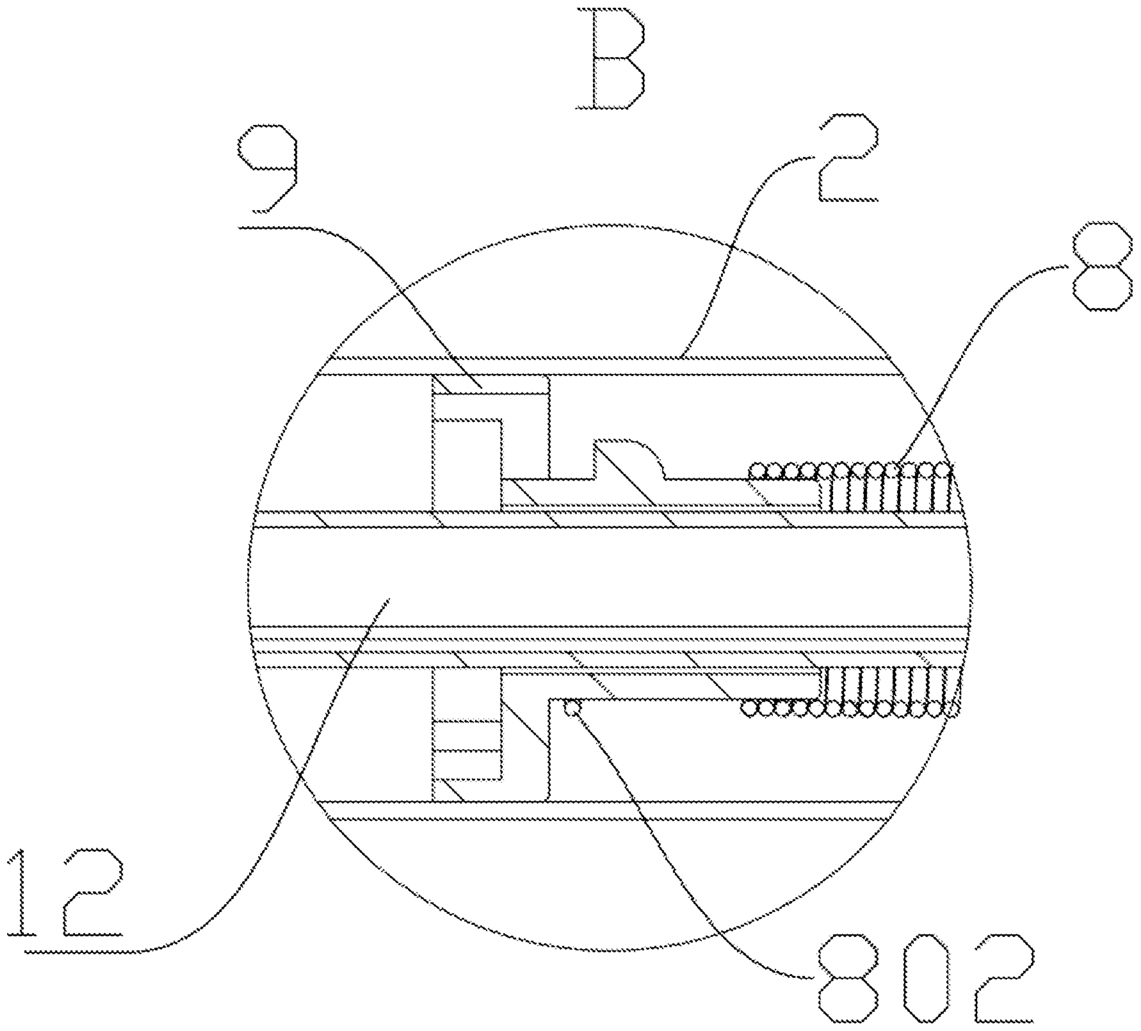
FIG. 5 is an enlarged view of B in FIG. 2 of the present invention.

Referring to FIG. 4, the one-way torsion spring 10 includes a first torsion arm 1001 and a second torsion arm 1002, and the first flange 601 is arranged between the first torsion arm 1001 and the second torsion arm 1002. When in the normal state, the first flange 601 abuts against the first torsion arm 1001, so that the one-way torsion spring 10 is locked tightly onto the mounting shaft 501.

Figure 21:
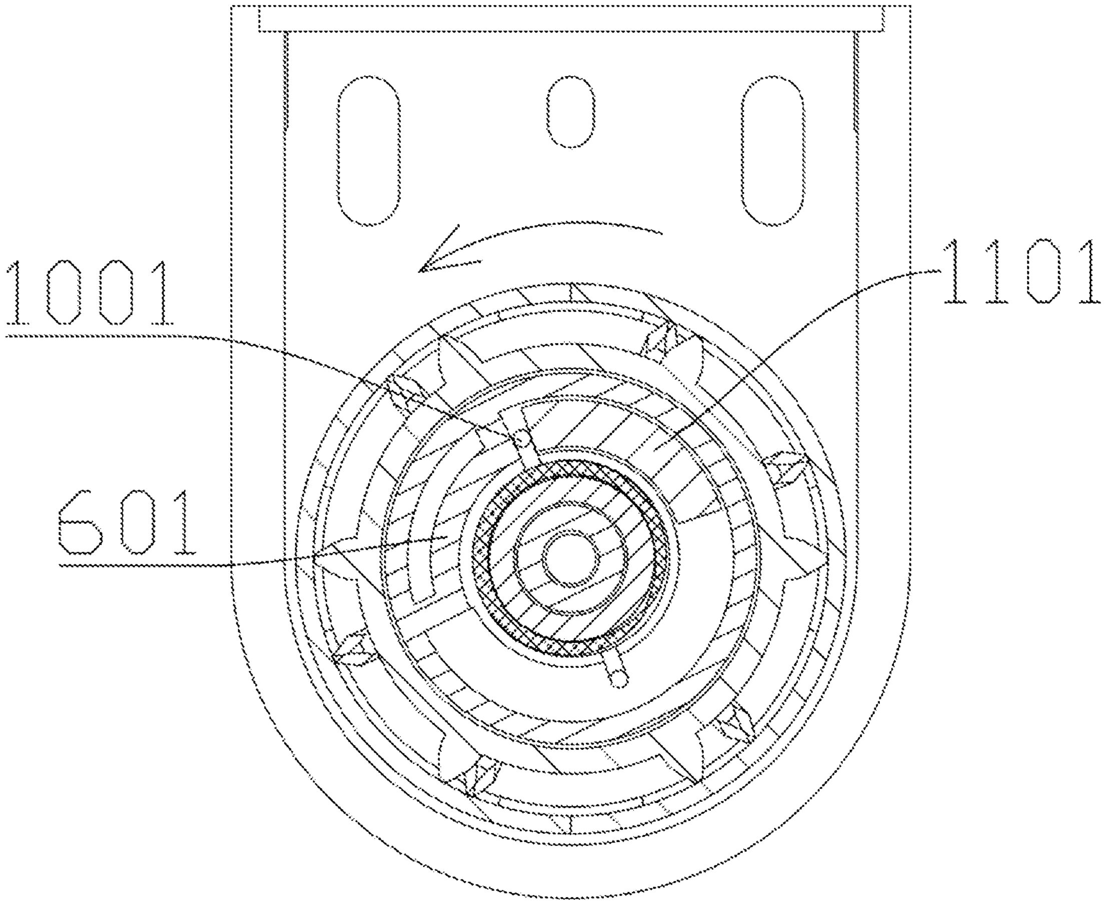
FIG. 21 is a structural schematic view of a torque adjustment knob according to the present invention when it is forwardly adjusting a torque.
Figure 22:
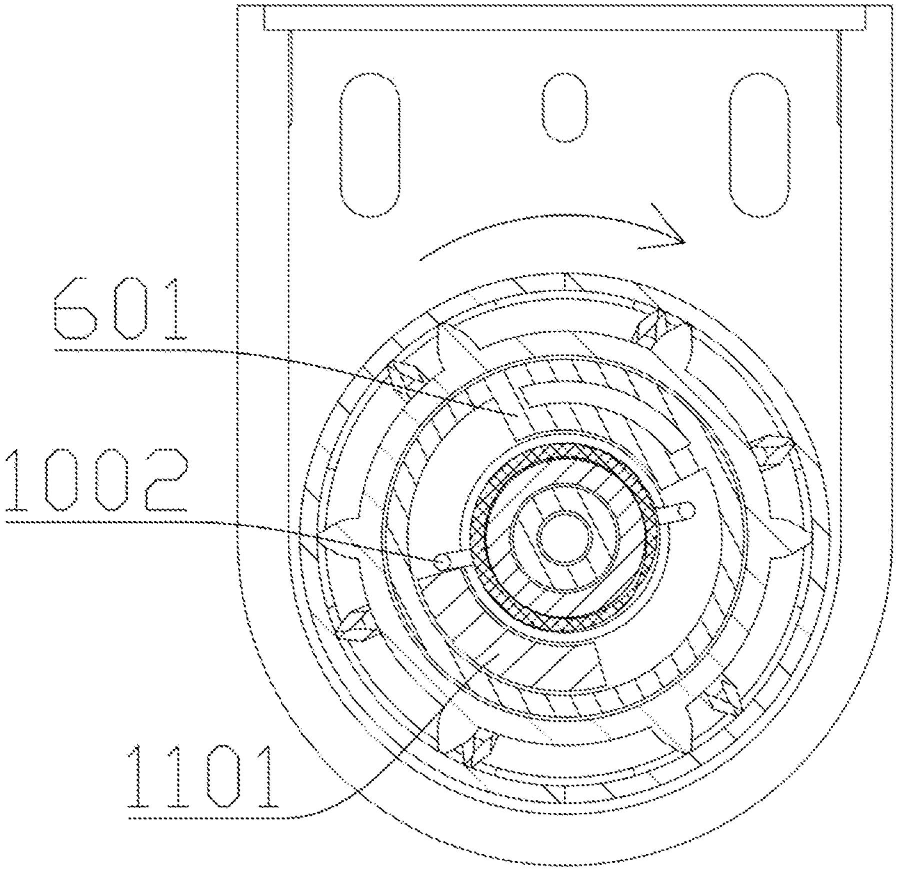
FIG. 22 is a structural schematic view of the torque adjustment knob according to the present invention when it is reversely adjusting the torque.

Referring to FIGS. 21 and 22, in this embodiment, the counterclockwise rotation direction is a forward direction, and the clockwise rotation direction is a reverse direction. Referring to FIG. 21, when the torque of the torsion spring 8 is forwardly adjusted, the second flange 1101 of the torque adjustment knob 11 is rotated counterclockwise, and the second flange 1101 drives the first flange 601 and the connecting rod group to rotate counterclockwise through the first torsion arm 1001, so that the torque of the torsion spring 8 becomes larger. Referring to FIG. 22, when the torque of the torsion spring 8 is reversely adjusted, the torque adjustment knob 11 is rotated clockwise, and the second flange 1101 drives the second torsion arm 1002 to rotate clockwise. After removing the rotational force applied to the torque adjustment knob 11, the first flange 601 will abut against the first torsion arm 1001 clockwise under the influence of the torsion of the torsion spring 8, so that the one-way torsion spring 10 continues to be locked tightly onto the mounting shaft 501, achieving the purpose of reducing the torque of the torsion spring 8.

Figure 15:
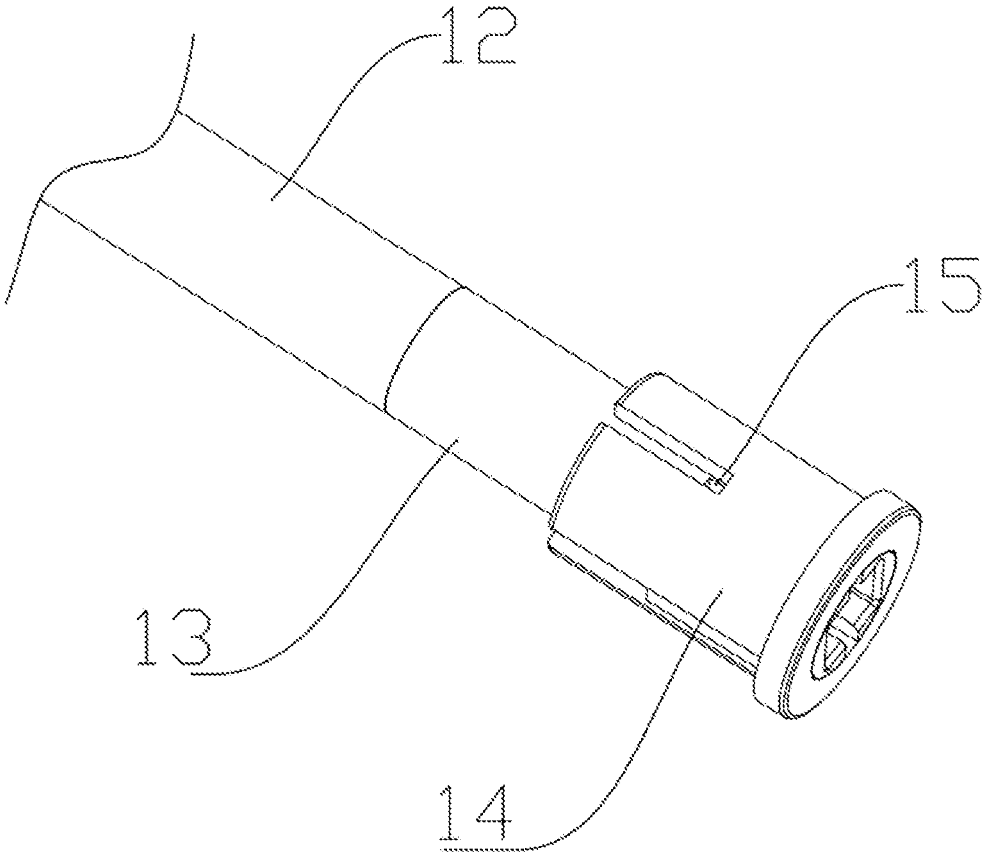
FIG. 15 is a perspective view of a connecting rod group according to the present invention.

Referring to FIGS. 15 to 18, the connecting rod group includes a torsion spring mounting rod 12 and a connecting rod 13 that are fixedly connected to each other, and the connecting rod 13 is coaxially fixedly connected to the guide sleeve 6. A first connecting arm 801 of the torsion spring 8 is mounted on the connecting rod 13. A positioning shaft sleeve 14 is sleeved on the connecting rod 13. Referring to FIG. 15, the connecting rod 13 and the positioning shaft sleeve 14 are combined to form a positioning engagement cavity 15 for positioning the first connecting arm 801. An inner sleeve 9 is rotatably mounted on the torsion spring mounting rod 12, and a connecting hook recess 901 for positioning and connecting a second connecting arm 802 of the torsion spring 8 is provided on the inner sleeve 9.

Figure 17:
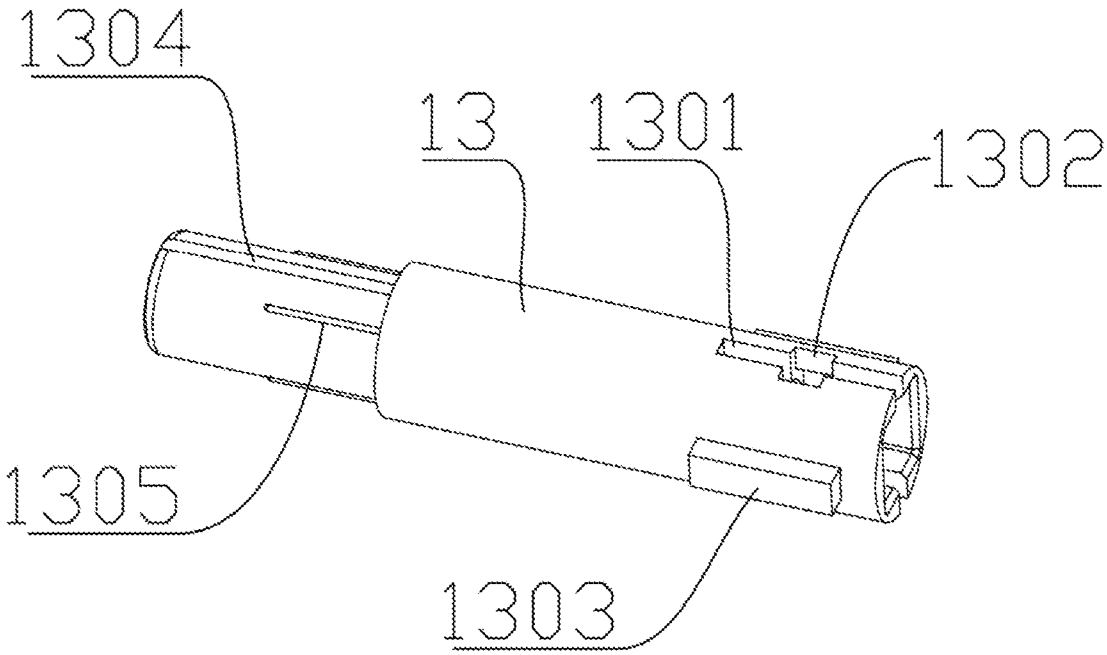
FIG. 17 is a perspective view of a connecting rod according to the present invention.
Figure 18:
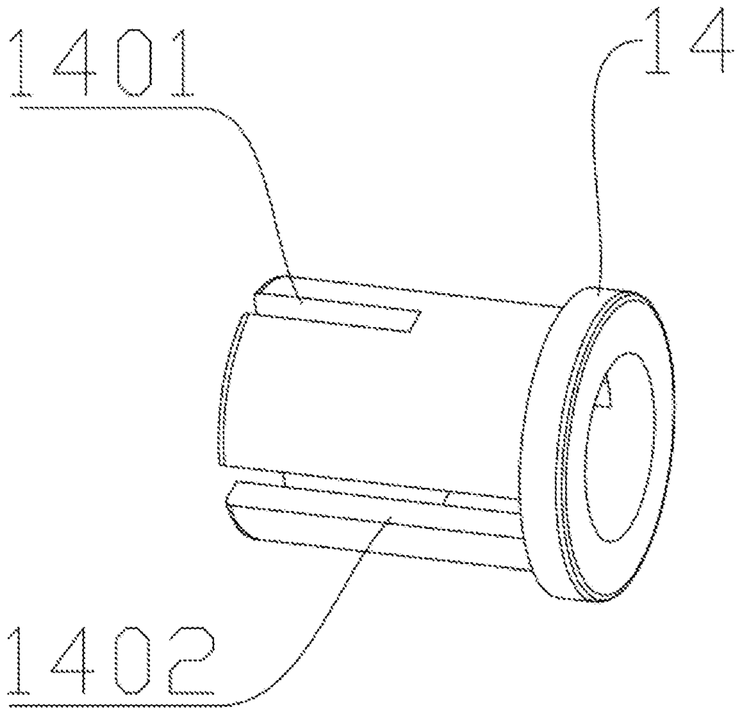
FIG. 18 is a perspective view of a positioning shaft sleeve according to the present invention.

Referring to FIGS. 17 and 18, a first through cavity 1301 for placing the first connecting arm 801 is provided on the connecting rod 13 to run therethrough, the positioning shaft sleeve 14 is correspondingly provided with a second through cavity 1401, and the first through cavity 1301 and the second through cavity 1401 are enclosed to form the positioning engagement cavity 15. A snap-fit recess 1302 is provided within a square hole at an end of the connecting rod 13, and a snap-fit protrusion 602 is correspondingly formed on a square shaft at an end of the guide sleeve 6. At least one guide recess 1402 is provided on an outer peripheral surface of the positioning shaft sleeve 14, a guide block 1303 fitting the guide recess 1402 is correspondingly arranged on an outer peripheral surface of the connecting rod 13, and a shaft shoulder at one end of the guide sleeve 6 limits the position of a side end surface of the positioning shaft sleeve 14 and abuts the same. Through the fit between the guide block 1303 and the guide recess 1402, and the fit between the shaft shoulder of the guide sleeve 6 and the side end surface of the positioning shaft sleeve 14, the axial position of the positioning shaft sleeve 14 on the connecting rod 13 is limited.

Figure 16:
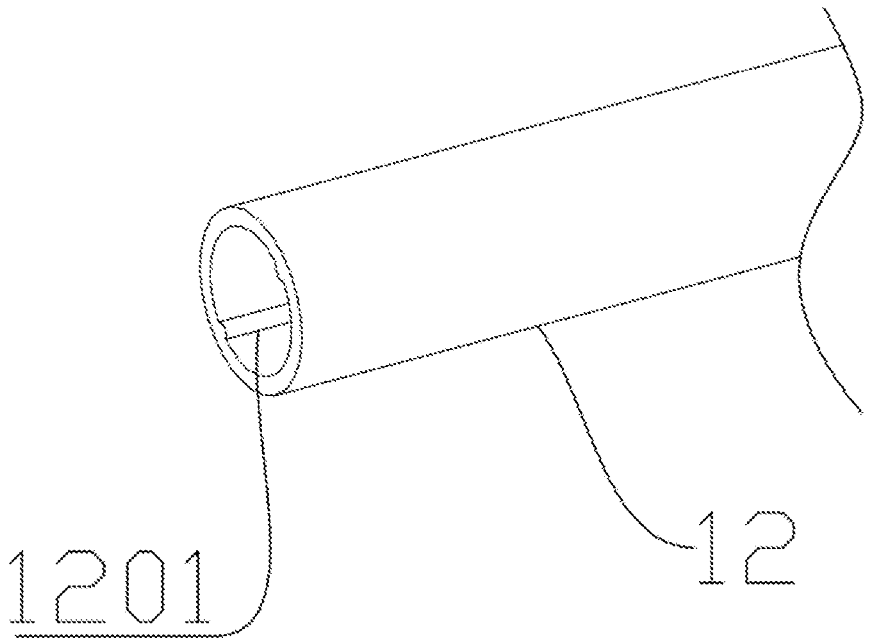
FIG. 16 is a perspective view of a torsion spring mounting rod according to the present invention.

Referring to FIGS. 16 and 17, a guide flange 1201 is provided within an inner hole of the torsion spring mounting rod 12, one end of the connecting rod 13 is provided with a guide engagement recess 1304 corresponding to the guide flange 1201, and the one end of the connecting rod 13 is further provided with a plurality of ribs 1305 that are in interference fit with the inner hole of the torsion spring mounting rod 12.

Figure 19:
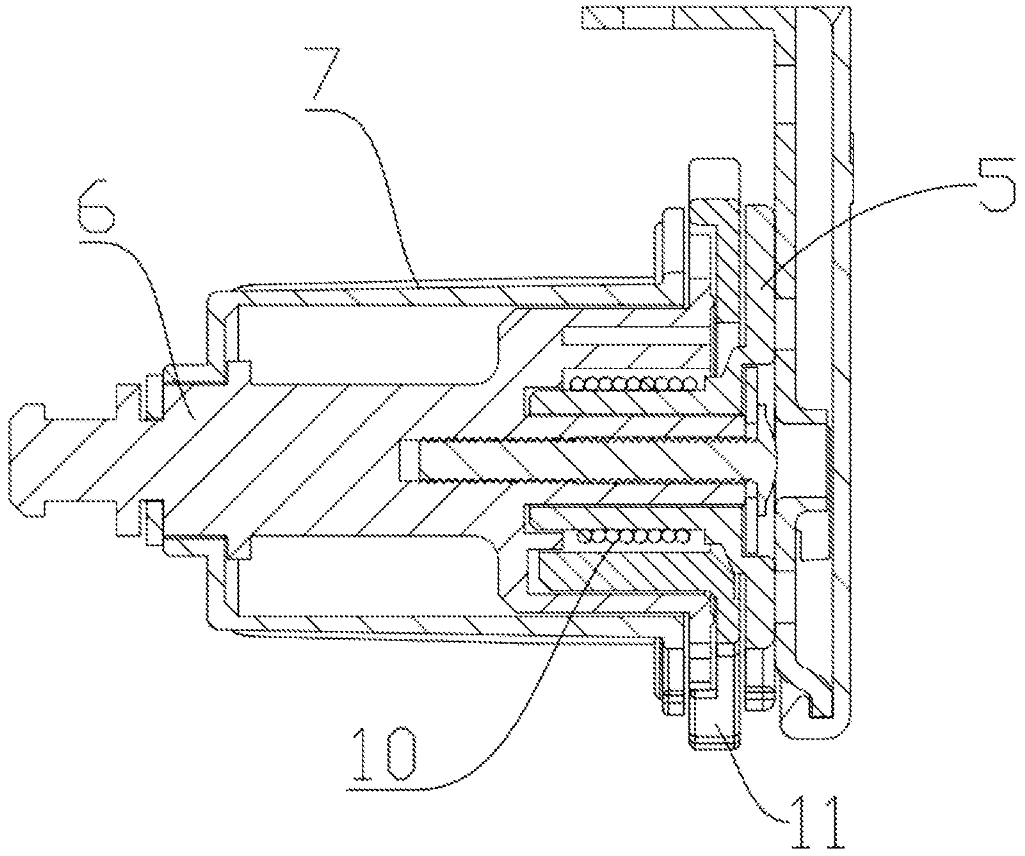
FIG. 19 is a perspective view of a torque adjustment assembly according to the present invention.
Figure 20:
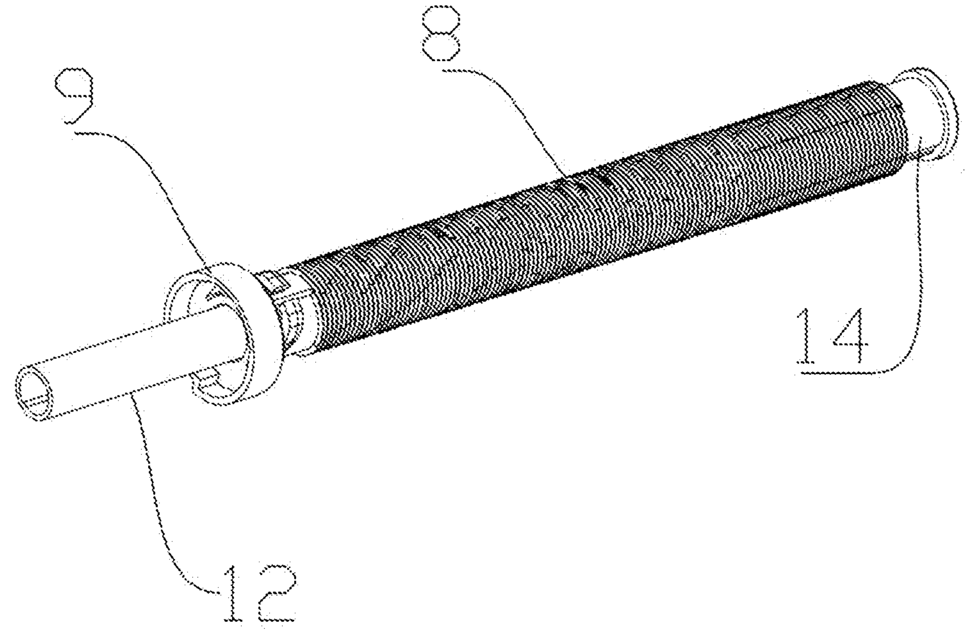
FIG. 20 is a perspective view of a torsion spring connecting rod assembly according to the present invention.

Referring to FIGS. 19 and 20, the torque adjustment assembly of this embodiment is a single whole, and the torsion spring 8 of the torsion spring connecting rod assembly may be selected according to the different weights of the roller blind 3 and the lower beam 301. During assembly, firstly, the second connecting arm 802 of the torsion spring 8 may be mounted on the inner sleeve 9, and the connecting rod 13 is set and fixed on the torsion spring mounting rod 12 to form a connecting rod group. Then, the inner sleeve 9 and the torsion spring 8 are mounted on the connecting rod group, so that the first connecting arm 801 of the torsion spring 8 is mounted into the first through cavity 1301 of the connecting rod 13. Then, the positioning shaft sleeve 14 is mounted, the square hole at the end of the connecting rod 13 is inserted into the square shaft at the end of the guide sleeve 6, and the coaxial fixed connection between the connecting rod 13 and the guide sleeve 6 is realized through the engagement of the snap-fit recess 1302 and the snap-fit protrusion 602. At this time, the shaft shoulder on one side of the square shaft of the guide sleeve 6 is correspondingly in fit with the side end surface of the positioning shaft sleeve 14 to realize the axial positioning of the positioning shaft sleeve 14, thereby connecting the torque adjustment assembly and the torsion spring connecting rod assembly to form the gravity-free spring roller blind controller of this embodiment.

During actual installation, before the entire controller 1 is mounted on the roller blind shaft 2, the torque of the torsion spring 8 may be loaded in advance according to the weights of the roller blind 3 and the lower beam 301. At this time, the torque adjustment knob 11 may be forwardly rotated to perform torque loading of the torsion spring. The torque loading of the torsion spring may also be realized by rotating the inner sleeve 9 at this time. Then, the inner sleeve 9 of the controller 1 is inserted into the roller blind shaft 2, so that the roller blind sleeve 7 is also inserted into a shaft end of the roller blind shaft 2. Finally, the torque is adjusted by rotating the torque adjustment knob 11. After the torque is adjusted in place, the position adjustment of the roller blind 3 at any height can be realized by pulling the lower beam 301 downward or pushing the lower beam 301 upward by hand.

During the downward or upward movement of the roller blind 3, the roller blind shaft 2 may drive the torsion spring 8 to twist through the inner sleeve 9, so that the torque of the torsion spring 8 changes. When the roller blind 3 is located at the lowermost position, the torsion spring 8 thereof has the maximum torque, and the torsional force of its torsion spring 8 is transmitted to the connecting rod 13 and the guide sleeve 6, so that the one-way torsion spring 10 is locked tightly onto the mounting shaft 501 of the torsion spring mounting seat 5, without driving the one-way torsion spring 10 to rotate. When the roller blind 3 is located at the uppermost position, the torsion spring 8 thereof has the minimum torque.

During the upward or downward movement of the roller blind 3, the guide sleeve 6, the torsion spring mounting rod 12, and the connecting rod 13 thereof do not rotate relatively. Only when the torque adjustment knob 11 is adjusted, the above three parts will be adjusted correspondingly by rotation.

Figure 3:
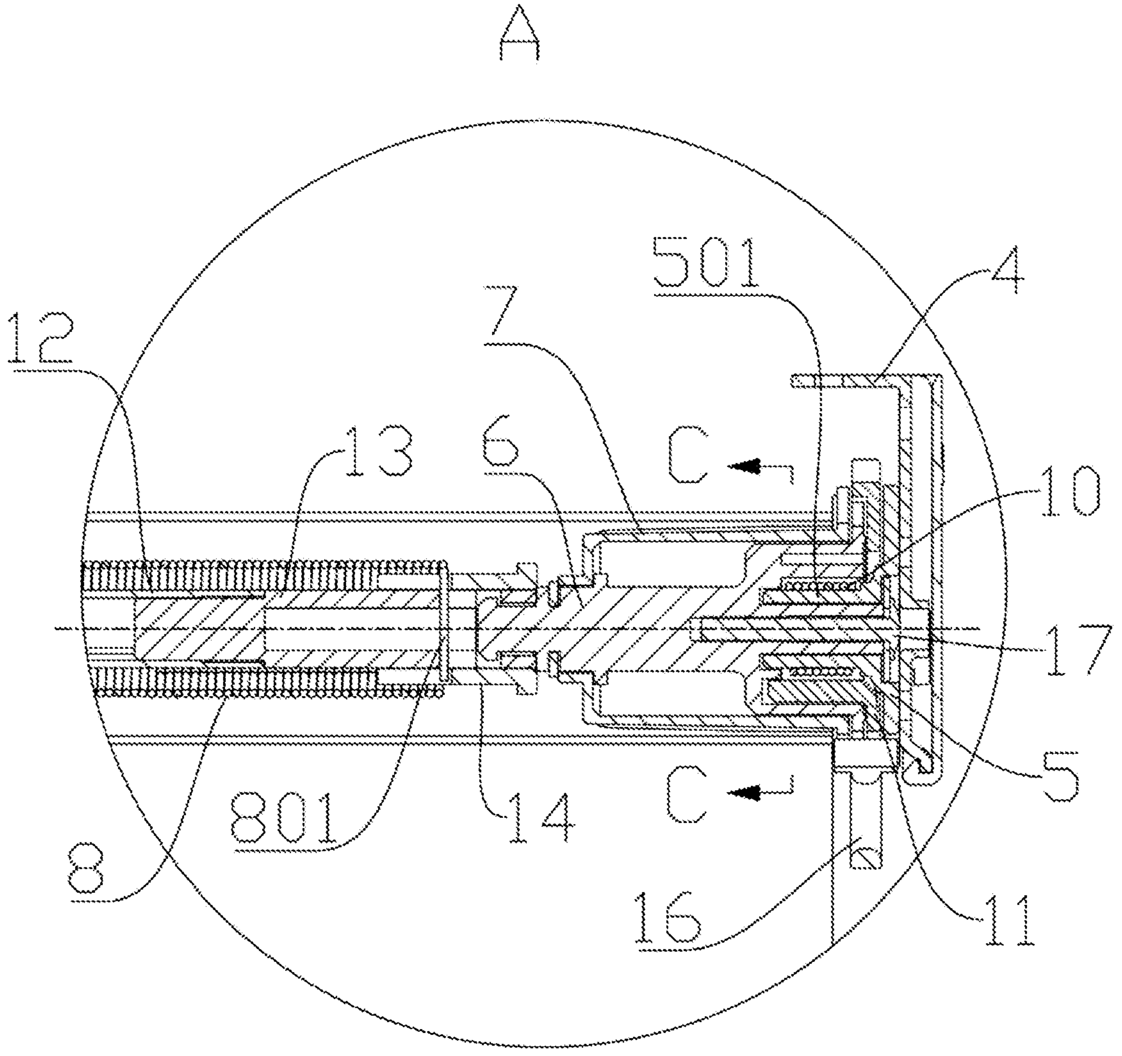
FIG. 3 is an enlarged view of A in FIG. 2 of the present invention.
Figure 8:
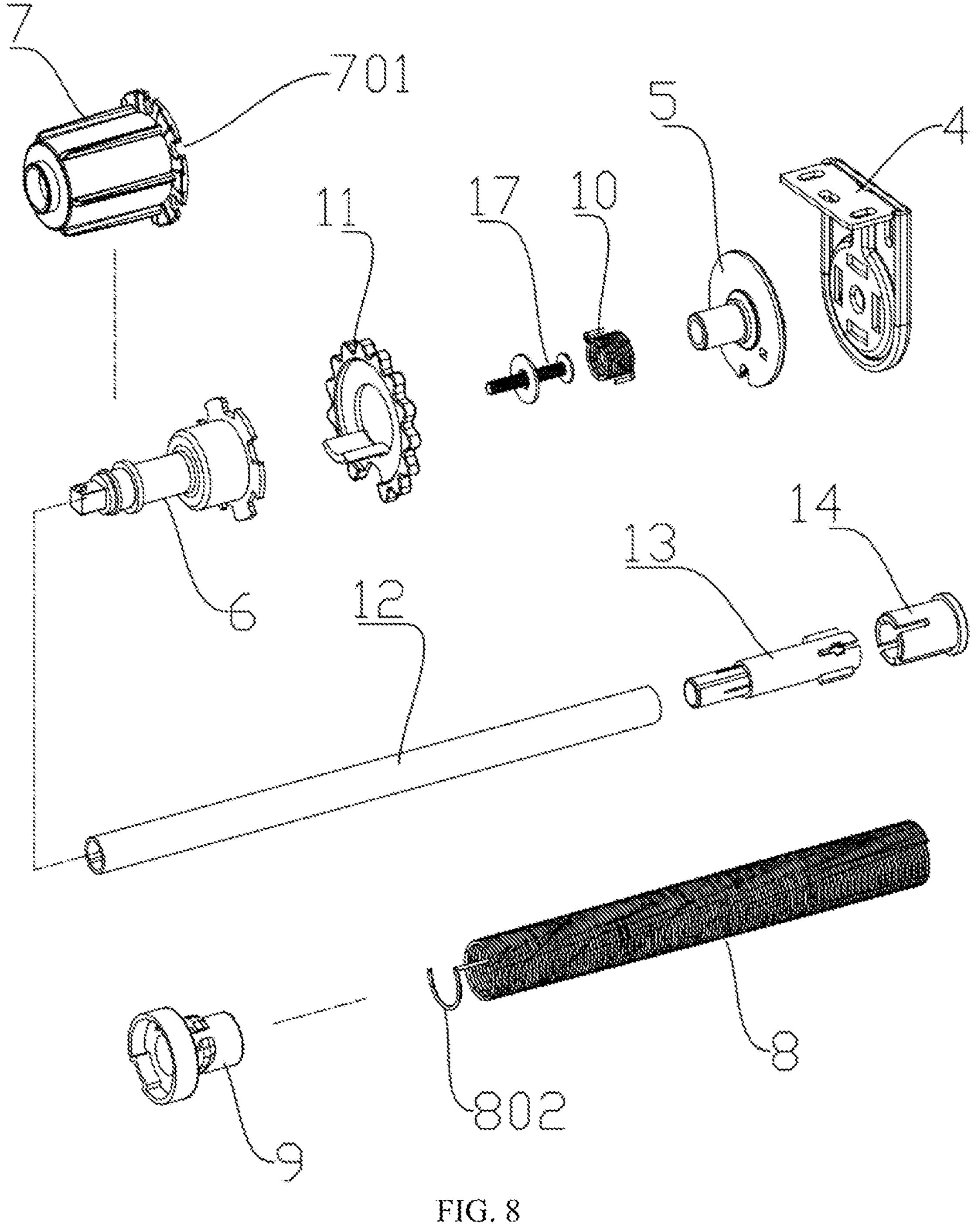
FIG. 8 is an exploded view of the controller according to the present invention.
Figure 9:
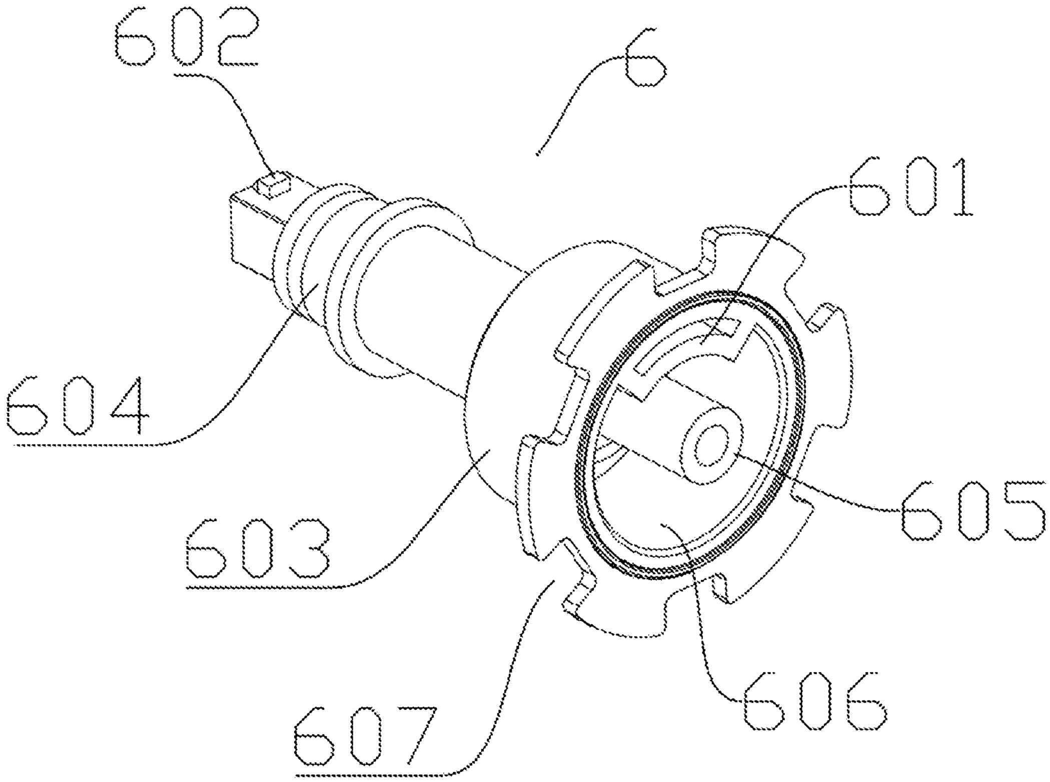
FIG. 9 is a perspective view of a guide sleeve according to the present invention.
Figure 10:
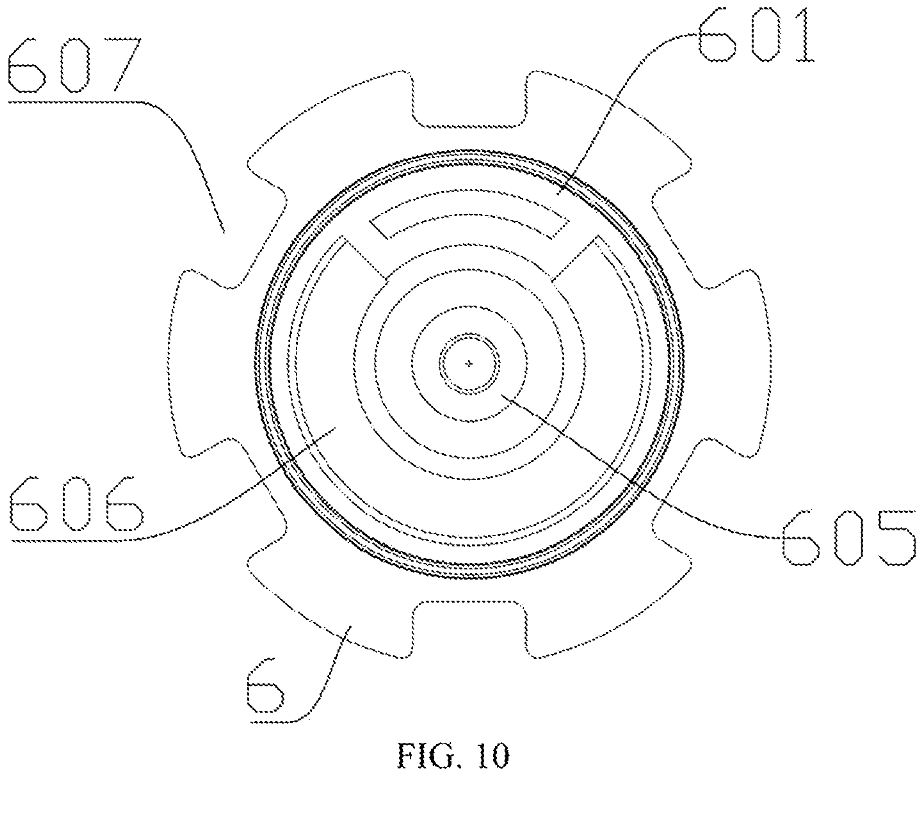
FIG. 10 is a right view of the guide sleeve according to the present invention.
Figure 11:
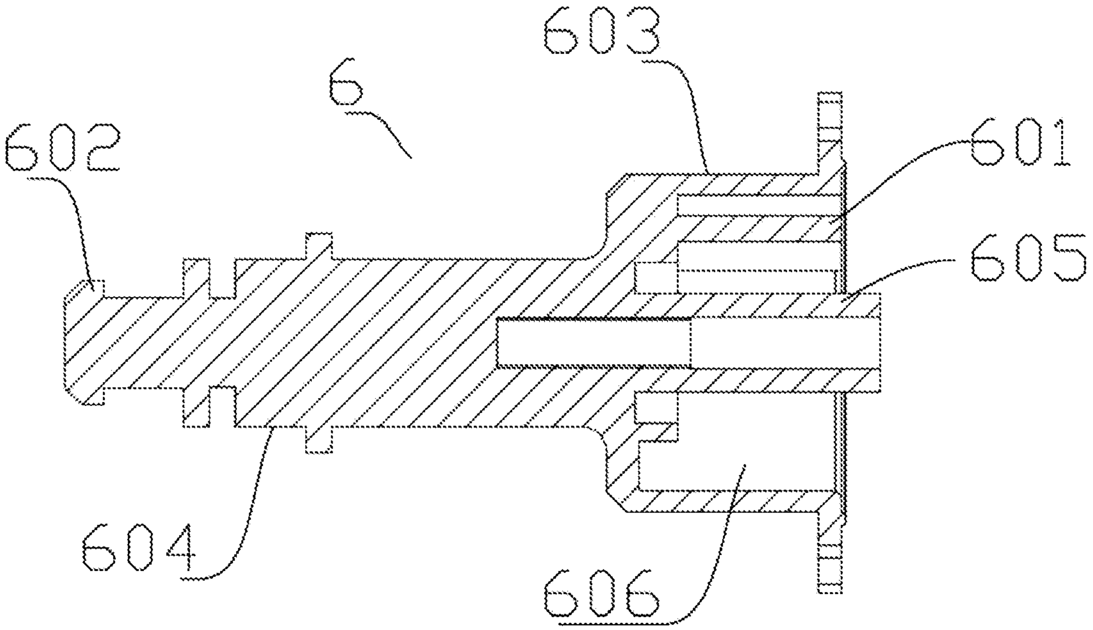
FIG. 11 is a cross-sectional view of the guide sleeve according to the present invention.
Figure 12:
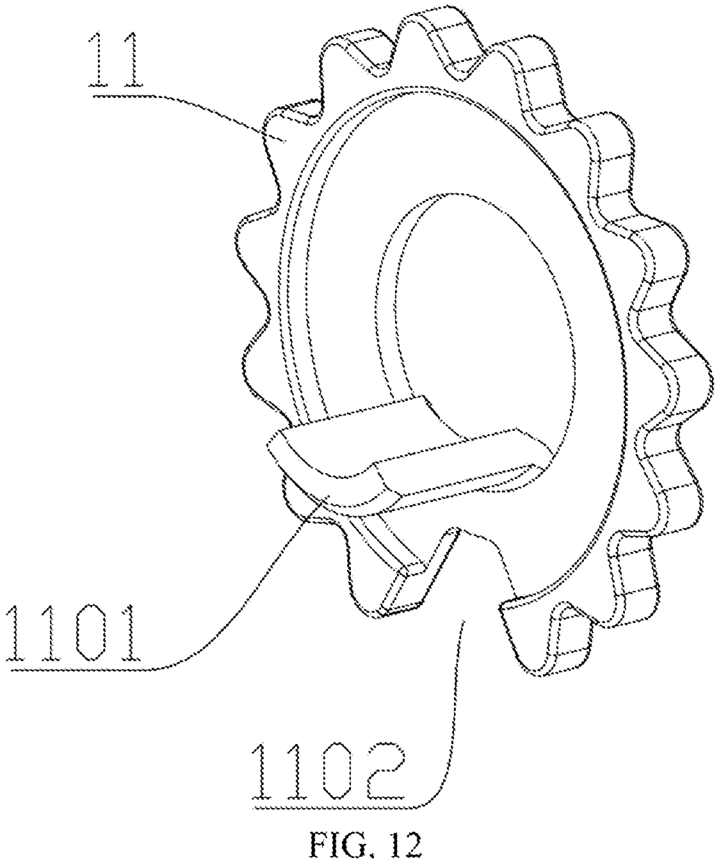
FIG. 12 is a perspective view of a torque adjustment knob according to the present invention.
Figure 13:
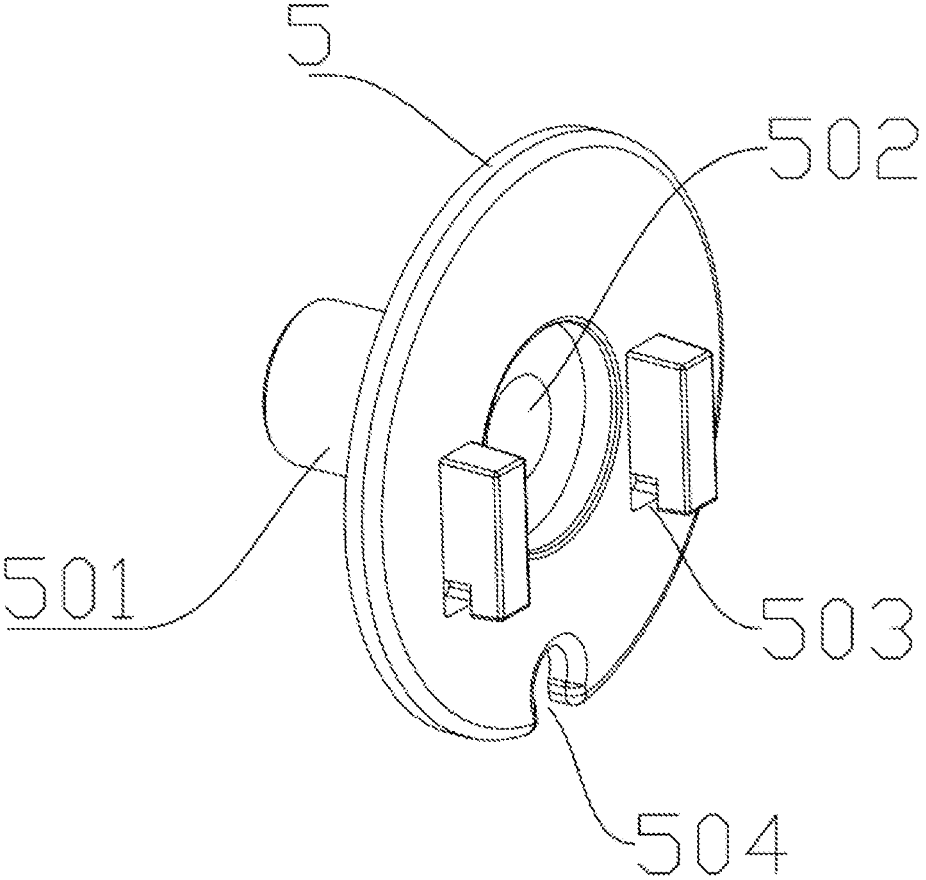
FIG. 13 is a perspective view of a torsion spring mounting seat according to the present invention.
Figure 14:
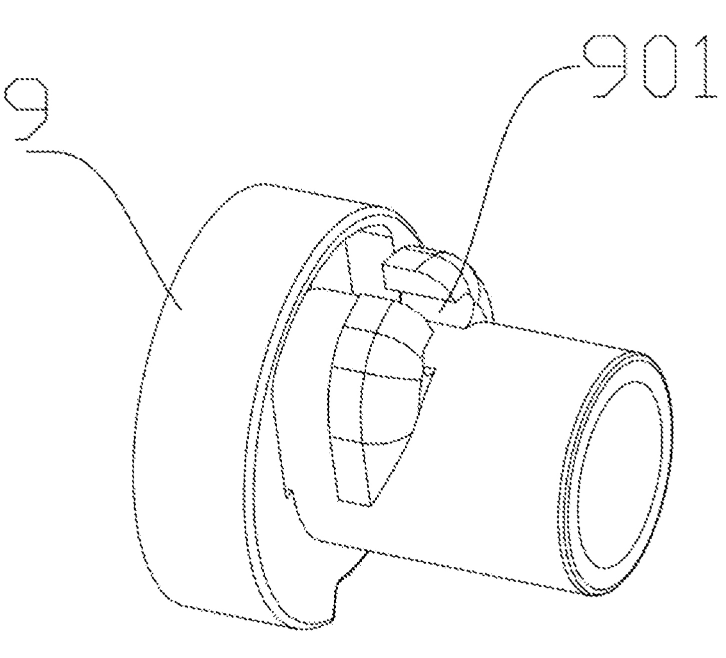
FIG. 14 is a perspective view of an inner sleeve according to the present invention.

Referring to FIGS. 3, 9 and 11, a first guide shaft 603 and a second guide shaft 604 configured to rotatably engage with the roller blind sleeve 7 are formed on an outer peripheral surface of the guide sleeve 6. A protruding third guide shaft 605 is provided within the inner cavity 606 of the guide sleeve 6. Referring to FIG. 13, the mounting shaft 501 is coaxially provided with a guide hole 502, and the third guide shaft 605 is rotatably engaged with the guide hole 502. Referring to FIGS. 3 and 8, in this embodiment, a bolt 17 and a gasket are mounted at the third guide shaft 605 to limit the axial displacement of the torsion spring mounting seat 5 on the guide sleeve 6. A side end of the torsion spring mounting seat 5 is provided with a hook 503 configured to be hooked and mounted on the bracket 4, and the bracket 4 is fixedly mounted on an external wall.

Figure 6:
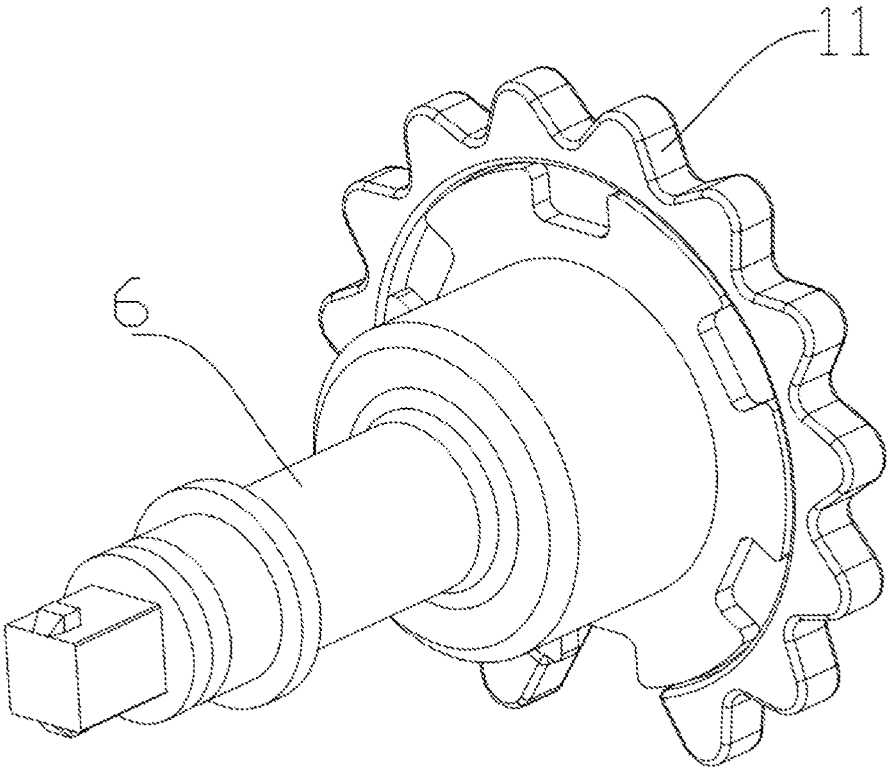
FIG. 6 is a perspective view of a guide sleeve and a torque adjustment knob according to the present invention.
Figure 7:
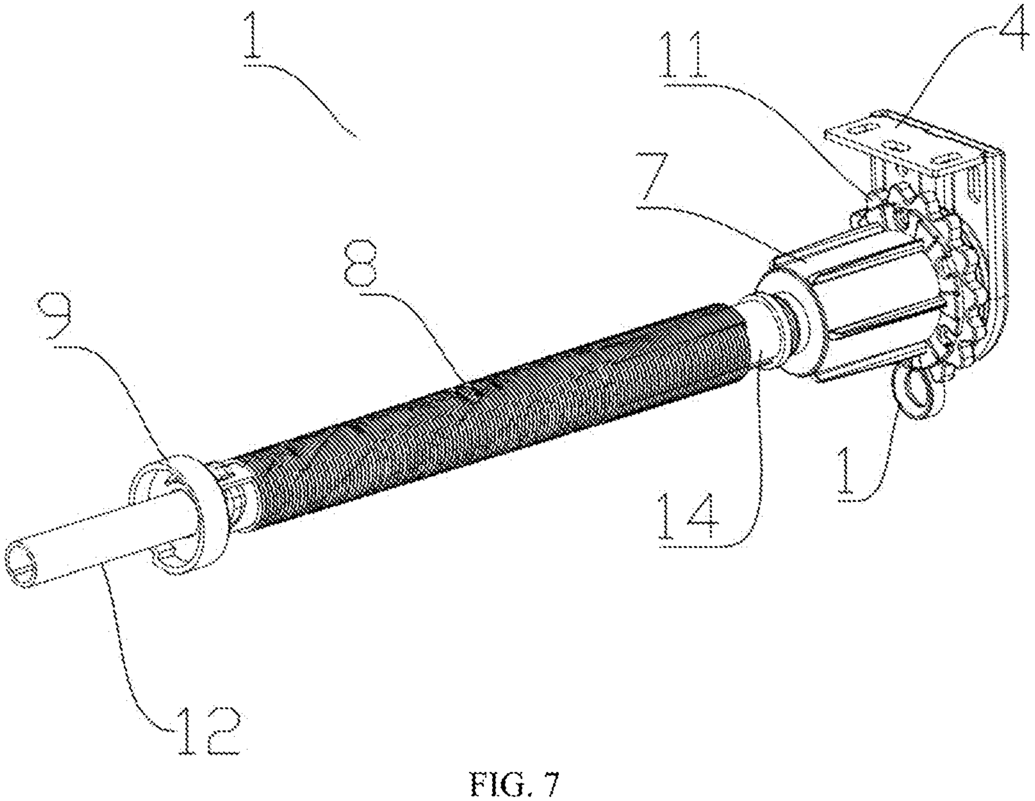
FIG. 7 is a perspective view of a controller according to the present invention.

Referring to FIG. 6, a detachable rotation stop block 16 is further mounted on the torque adjustment assembly, a first rotation stop hole 701 is correspondingly provided on an outer peripheral surface of the roller blind sleeve 7, a second rotation stop hole 607 is correspondingly provided on an outer peripheral surface of the guide sleeve 6, a third rotation stop hole 1102 is correspondingly provided on an outer peripheral surface of the torque adjustment knob 11, and a fourth rotation stop hole 504 is correspondingly provided on an outer peripheral surface of the torsion spring mounting seat 5. The four rotation stop holes are engaged with the rotation stop block 16 to limit the rotation of the roller blind sleeve 7, the guide sleeve 6, the torque adjustment knob 11, and the torsion spring mounting seat 5. The function of the rotation stop block 16 is to facilitate the use during factory transportation, and during installation and use, the rotation stop block 16 is pulled out.

Referring to FIG. 4, the first flange 601 and the second flange 1101 each are fan-shaped.

The preferred implementations of the present invention are merely described above. It should be noted that, for those of ordinary skill in the art, several improvements and modifications can also be made without departing from the technical principles of the present invention, and these improvements and modifications should also be regarded as the scope of protection of the present invention.

What is claimed is:

1. A gravity-free spring roller blind controller, the controller being configured to be mounted on a shaft end of a hollow roller blind shaft, and the roller blind shaft being wound with a roller blind, wherein:

the controller comprises a torque adjustment assembly and a torsion spring connecting rod assembly connected to each other;

the torque adjustment assembly comprises a bracket, a torsion spring mounting seat fixed on the bracket, a guide sleeve rotatably sleeved on the torsion spring mounting seat, and a roller blind sleeve rotatably sleeved on the guide sleeve;

the torsion spring connecting rod assembly comprises a connecting rod group coaxially fixedly connected to the guide sleeve, a torsion spring and an inner sleeve connected to one end of the torsion spring are mounted on the connecting rod group, the inner sleeve is fixedly connected to the roller blind shaft, and the roller blind shaft drives the torsion spring to rotate through the inner sleeve;

a one-way torsion spring is sleeved on a mounting shaft of the torsion spring mounting seat, the guide sleeve is further rotatably sleeved with a torque adjustment knob, a first flange is provided within an inner cavity of the guide sleeve, and a second flange falling within the inner cavity is provided on the torque adjustment knob;

when in a normal state, the first flange reversely pushes the one-way torsion spring so that the one-way torsion spring is locked tightly onto the mounting shaft; and when torque adjustment is performed, the torque adjustment knob is forwardly or reversely rotated, and the second flange forwardly or reversely drives the guide sleeve and the connecting rod group to rotate through a torsion arm of the one-way torsion spring, so that the torque of the torsion spring is increased or decreased.

2. The gravity-free spring roller blind controller of claim 1, wherein the one-way torsion spring comprises a first torsion arm and a second torsion arm, and the first flange is arranged between the first torsion arm and the second torsion arm; and when in the normal state, the first flange abuts against the first torsion arm so that the one-way torsion spring is locked tightly onto the mounting shaft.

3. The gravity-free spring roller blind controller of claim 1, wherein the connecting rod group comprises a torsion spring mounting rod and a connecting rod fixedly connected to each other, and the connecting rod is coaxially fixedly connected to the guide sleeve; and a first connecting arm of the torsion spring is mounted on the connecting rod.

4. The gravity-free spring roller blind controller of claim 3, wherein a positioning shaft sleeve is sleeved on the connecting rod, and the connecting rod and the positioning shaft sleeve are combined to form a positioning engagement cavity for positioning the first connecting arm; and the inner sleeve is rotatably mounted on the torsion spring mounting rod, and a connecting hook recess for positioning and connecting a second connecting arm of the torsion spring is provided on the inner sleeve.

5. The gravity-free spring roller blind controller of claim 4, wherein a first through cavity for placing the first connecting arm is provided on the connecting rod to run therethrough, the positioning shaft sleeve is correspondingly provided with a second through cavity, and the first through cavity and the second through cavity are enclosed to form the positioning engagement cavity; and a snap-fit recess is provided within a square hole at an end of the connecting rod, and a snap-fit protrusion is correspondingly formed on a square shaft at an end of the guide sleeve.

6. The gravity-free spring roller blind controller of claim 4, wherein at least one guide recess is provided on an outer peripheral surface of the positioning shaft sleeve, a guide block fitting the guide recess is correspondingly provided on an outer peripheral surface of the connecting rod, and a shaft shoulder at one end of the guide sleeve limits the position of a side end surface of the positioning shaft sleeve and abuts the same.

7. The gravity-free spring roller blind controller of claim 6, wherein a guide flange is provided in an inner hole of the torsion spring mounting rod, one end of the connecting rod is provided with a guide engagement recess corresponding to the guide flange, and the one end of the connecting rod is further provided with a plurality of ribs in interference fit with the inner hole of the torsion spring mounting rod.

8. The gravity-free spring roller blind controller of claim 1, wherein a first guide shaft and a second guide shaft configured to rotatably engage with the roller blind sleeve are formed on an outer peripheral surface of the guide sleeve; a protruding third guide shaft is provided within the inner cavity of the guide sleeve, the mounting shaft is coaxially provided with a guide hole, and the third guide shaft is rotatably engaged with the guide hole; and a side end of the torsion spring mounting seat is provided with a hook configured to be hooked and mounted on the bracket, and the bracket is fixedly mounted on an external wall.

9. The gravity-free spring roller blind controller of claim 1, wherein a detachable rotation stop block is further mounted on the torque adjustment assembly, a first rotation stop hole is correspondingly provided on an outer peripheral surface of the roller blind sleeve, a second rotation stop hole is correspondingly provided on an outer peripheral surface of the guide sleeve, a third rotation stop hole is correspondingly provided on an outer peripheral surface of the torque adjustment knob, and a fourth rotation stop hole is correspondingly provided on an outer peripheral surface of the torsion spring mounting seat.

10. The gravity-free spring roller blind controller of claim 1, wherein the roller blind sleeve is connected to the roller blind shaft, the lower end of the roller blind comprises a lower beam, and a supporting sleeve is mounted at the other end of the roller blind shaft; and the first flange and the second flange each are fan-shaped.

* * * * *